(12) United States Patent
Shrestha et al.

(10) Patent No.: US 12,704,761 B2
(45) Date of Patent: Aug. 11, 2026

(54) EMITTER ARRAY

(71) Applicant: VOYANT PHOTONICS, INC., New York, NY (US)

(72) Inventors: Sajan Shrestha, New York, NY (US); Christopher T. Phare, New York, NY (US); Lawrence Dah Ching Tzuang, New York, NY (US)

(73) Assignee: Voyant Photonics, Inc., New York, NY (US)

( * ) Notice: Subject to any disclaimer, the term of this patent is extended or adjusted under 35 U.S.C. 154(b) by 1430 days.

(21) Appl. No.: 17/373,201

(22) Filed: Jul. 12, 2021

(65) Prior Publication Data

US 2022/0011643 A1 Jan. 13, 2022

Related U.S. Application Data

(60) Provisional application No. 62/705,674, filed on Jul. 10, 2020.

(51) Int. Cl.

| | |
|---|---|
| ***G02F 1/295*** | (2006.01) |
| ***G01S 7/481*** | (2006.01) |
| ***G01S 17/08*** | (2006.01) |

(52) U.S. Cl.

CPC .......... *G02F 1/2955* (2013.01); *G01S 7/4815* (2013.01); *G01S 7/4816* (2013.01); *G01S 17/08* (2013.01)

(58) Field of Classification Search

CPC .... G02F 1/2955; G01S 7/4815; G01S 7/4816; G01S 7/08; G02B 6/0016; G02B 6/0015;

(Continued)

(56) References Cited

U.S. PATENT DOCUMENTS

| | | | | |
|---|---|---|---|---|
| 9,476,981 | B2 * | 10/2016 | Yaacobi | G01S 17/931 |
| 10,094,661 | B2 * | 10/2018 | Hsu | G01C 3/08 |

(Continued)

FOREIGN PATENT DOCUMENTS

| | | |
|---|---|---|
| WO | 2020056307 | 3/2020 |

OTHER PUBLICATIONS

International Search Report issued in respect of corresponding PCT International Application No. PCT/US2021/041255, on Nov. 3, 2021.

*Primary Examiner* — Kimberly N. Kakalec
(74) *Attorney, Agent, or Firm* — Stratford Group Ltd.

(57) ABSTRACT

In an optical emitter device, when point emitters are placed on the focal plane of a lens system, each individual point emitter will point to a specific free space angle depending on the position of the point emitter relative to the longitudinal central axis of the lens system. The plurality of point emitters are arranged in an array comprising a plurality of rows of point emitters and a plurality of columns of point emitters. Each of the plurality of point emitters comprises a grating coupler configured to emit a respective beam of light in a respective transmission direction. Each grating coupler comprises a first plurality of periodically spaced optical waveguide grating structures, at least some of the optical waveguide grating structures including a notch, whereby a first portion of each optical waveguide grating structure extends a different height than a second portion.

19 Claims, 12 Drawing Sheets

(58) Field of Classification Search
CPC .......... G02B 6/0033–0063; G02B 6/34; G02B 27/0038; G02B 27/0087; G02B 27/10; G02B 27/1086; G02B 27/42; G02B 27/4233; G02B 27/425; G02B 27/4272; G02B 27/4277
See application file for complete search history.

(56) References Cited

U.S. PATENT DOCUMENTS

| | | | | |
|---|---|---|---|---|
| 10,333,227 | B2 | 6/2019 | Hideki et al. | |
| 10,989,876 | B1 * | 4/2021 | Peng | G02B 6/305 |
| 2004/0156589 | A1 * | 8/2004 | Gunn, III | G02B 6/12004<br>385/37 |
| 2008/0159692 | A1 | 7/2008 | Steve | |
| 2014/0193115 | A1 * | 7/2014 | Popovic | G02B 6/124<br>385/14 |
| 2015/0125943 | A1 * | 5/2015 | Molnar | G01B 11/14<br>356/614 |
| 2016/0109659 | A1 * | 4/2016 | Jiang | G02B 6/305<br>438/24 |
| 2016/0170287 | A1 * | 6/2016 | Bitauld | G02F 1/2955<br>385/4 |
| 2019/0207362 | A1 * | 7/2019 | Kong | G02B 6/34 |
| 2020/0003956 | A1 * | 1/2020 | Kuo | G02B 6/4214 |
| 2020/0150240 | A1 * | 5/2020 | Huwer | G01S 7/4865 |

* cited by examiner 1 or 101
3
F
F
9
$5_{18}$
$4_i$
2 or 102
OA
d
$4_o$
7
8
$5_{11}$ 24
24
24
24
2
$5_{14}$
$5_{24}$
$5_{23}$
$5_{34}$
$5_{44}$
$5_{n4}$ 15
15
$5_{11}$
$5_{n1}$
$5_{41}$
13
14
12
14
14
14
14
$11_1$
$11_4$
$11_n$

B
C
24
21
15'
7
9
8
22
23
32
33

23
22
9

23
9

22
52
52
9

EMITTER ARRAY

TECHNICAL FIELD

The present disclosure relates to an emitter array, and in particular to an emitter array for a LIDAR system.

BACKGROUND

Conventional integrated optical phased arrays launch and receive beams of light at a variety of controllable angles for various applications, including free-space communications, holography, and light detection and ranging (LIDAR). A LIDAR sensor is an optical remote sensor that measure the distance to a target, by irradiating the target with light, using pulses or a modulated signal from a laser, and measuring the time it takes the light to travel to and from the target to a receiver in the LIDAR sensor. When, the reflected pulses or modulated signals are detected, the time of flight of the pulses or modulated signals correspond to the distance to the sensed target. LIDAR sensors are important components in autonomous vehicles, drone navigation systems, and robot interaction, but is currently costly and relatively large.

Conventional methods to achieve large aperture on-chip non-mechanical beam steering, such as phased-arrays may have one or more of the following problems: 1) high power consumption, 2) limited to one-dimensional steering, 3) sophisticated beamforming algorithms, and 4) strict requirement for fabrication process uniformity.

To overcome some of the aforementioned problems a one-dimensional or a two-dimensional array of point emitters are arranged on a chip. When the point emitters are placed on the focal plane of a lens system, each individual point emitter will point to a specific free space angle depending on the position of the point emitter relative to the longitudinal central axis of the lens system, as in WO 2020/0506307, entitled Beam Steering and Receiving Method Based on an Optical Switch Array, published Mar. 19, 2020, which is incorporated herein by reference. However, the point emitters that can be fabricated in commercially available silicon photonics foundries are typically grating couplers, which may have one or more of the following problems: 1) inefficient emission, 2) non-uniformity of fabrication process, 3) strong wavelength dependence, and 4) inability to implement a low loss monostatic system leveraging the polarization of light.

SUMMARY

Accordingly, the present disclosure relates to an optical emitter device comprising:

- a plurality of point emitters arranged in an array comprising a plurality of rows of point emitters and a plurality of columns of point emitters, each of the plurality of point emitters comprising:
- a grating coupler configured to emit a respective beam of light in a respective transmission direction;
- each grating coupler comprising: a first plurality of periodically spaced optical waveguide grating structures, at least some of the optical waveguide grating structures including
- a notch, whereby a first portion of each optical waveguide grating structure extends a different height than a second portion.

BRIEF DESCRIPTION OF THE DRAWINGS

The invention will be described in greater detail with reference to the accompanying drawings which represent preferred embodiments thereof, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
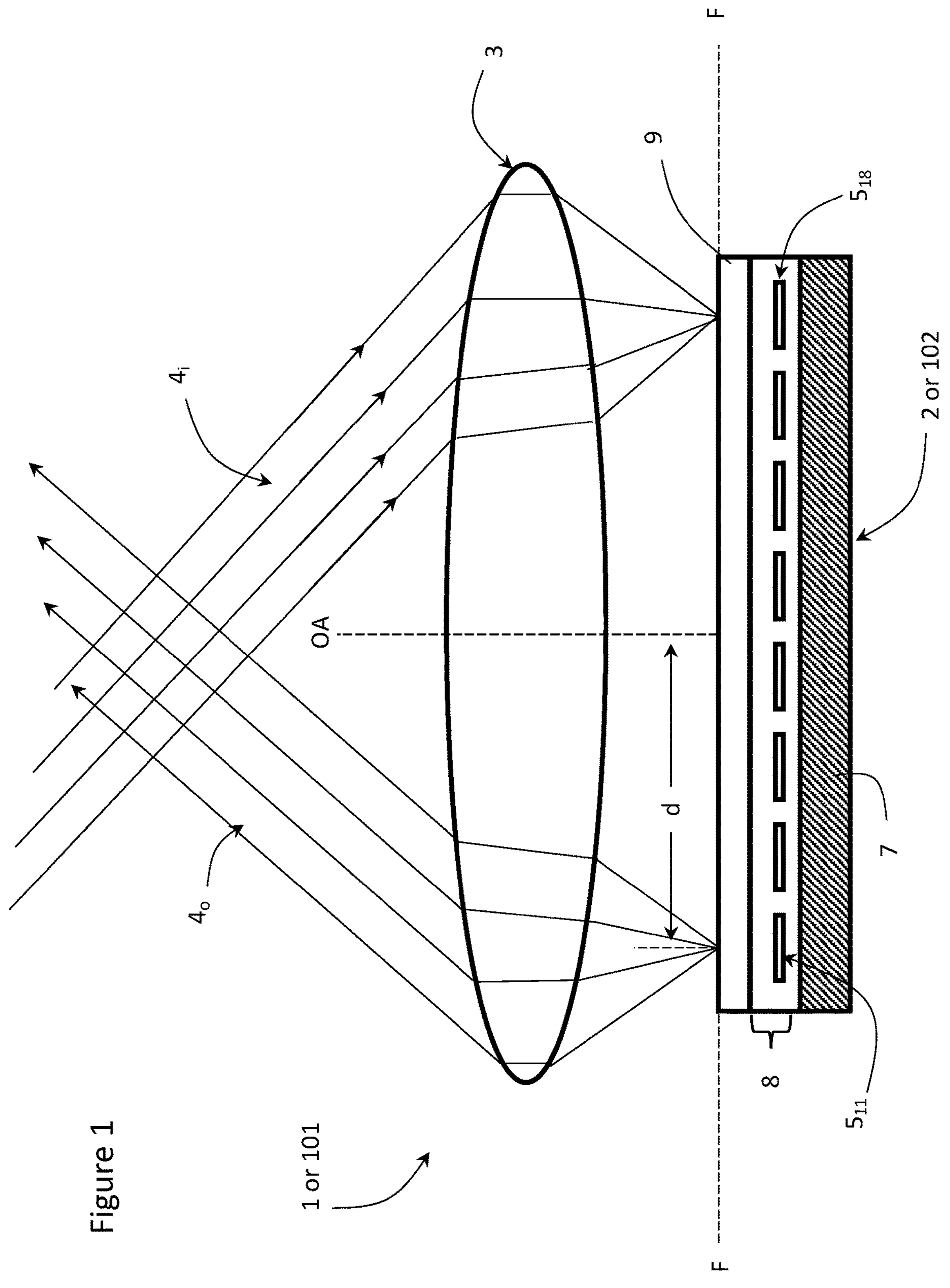
FIG. 1 is a side view of an optical emitter device in accordance with an embodiment of the present disclosure.

Long range LIDAR systems rely on efficient transmitting and receiving a highly focused or collimated beam to and from different angular directions. While lenses are typically associated with imaging, lenses may be applied to both beamforming and beam-steering. With reference to FIG. 1, an optical emitter device 1 includes an emitter array 2 and a beam steering lens system 3. For beamforming, a highly collimated output beam $\mathbf{4}_o$ may be transmitted when a point emitter $\mathbf{5}_{11}$ to $\mathbf{5}_{nm}$ from the emitter array 2 is placed on the focal plane F of the lens system 3 (infinite conjugation). The reverse propagation is also true based on the reciprocity theorem, whereby a parallel input beam $\mathbf{4}_i$ shining on the lens system 3 will focus at a point spot to be captured by one of the point emitters $\mathbf{5}_{11}$ to $\mathbf{5}_{nm}$, with a slight spread limited by lens aberration and diffraction. For beam-steering, the far-field beam angle $\alpha$ of the shaped, e.g. substantially collimated or focused, output beam $4_o$ depends on the location of the point emitter $5_{11}$ to $5_{nm}$, on the focal plane F relative to the longitudinal central optical axis OA of the lens system 3. The beam angle α is governed by the equation: α=arctan(d/f), where d is the distance from the center of the focal plane, i.e. the point where the optical axis OA coincides with the focal plane F, and f is the focal length of the lens system 3. Therefore, a full LIDAR system may be implemented by placing an emitter array 2 of point emitters $5_{11}$ to $5_{nm}$ on or near the focal plane F of the lens system 3, then selectively switching on and off each point emitter $5_{11}$ to $5_{nm}$, to steer the one or more output beams $4_o$ in the desired directions at the desired beam angles α. This method is fundamentally different than optical phased arrays as the relative optical phase between the emitters does not need to be controlled, and only one point emitter $5_{11}$ to $5_{nm}$ needs to be turned on at a time. Moreover, a plurality of point emitters $5_{11}$ to $5_{nm}$ may be activated simultaneously for transmitting multiple output beams $4_0$ pointing in different directions, i.e. at different beam angles $\alpha_{11}$ to $\alpha_{nm}$.

The emitter array 2 may include: a main substrate 7 for supporting an optical waveguide structure 8, including the point emitter $5_{11}$ to $5_{nm}$; and an upper turning substrate 9 for supporting beam directing and/or beam shaping elements, as hereinafter described. Ideally, the point emitters $5_{11}$ to 5 nm are arranged into an array of point emitters $5_{11}$ to $5_{nm}$ comprising a plurality (n) of rows of point emitters $5_{11}$ to $5_{nm}$, and a plurality (m) of columns of point emitters $5_{11}$ to $5_{nm}$. Typically, the point emitters in the rows of point emitters are aligned, and the point emitters in the columns of point emitters are aligned, but the rows and/or columns of point emitters may be offset. There are many ways that the point emitters $5_{11}$ to 5*n* may be realized, including end-fire tapers, end-fire tapers with a turning mirror, single layer grating couplers, and bilayer grating couplers.

The design of the lens system 3 may be critical to the system's performance. The lens system 3 may comprise a plurality of lens elements, if required. Most of the design of the lens system 3 is a compromise between the F-number, the field-of-view, and the aperture size. However, there may be a few design priorities: e.g. a) to have an image-plane telecentric design, where the chief rays from the point emitters $5_{11}$ to $5_{nm}$, are all parallel to the optical axis OA in the image space, b) reaching diffraction limit across the field-of-view, and c) the image space numerical aperture (NA) of the lens system 3 substantially matches the NA of the point emitters $5_{11}$ to $5_{nm}$. Chief rays parallel to the optical axis OA will enable the point emitters $5_{11}$ to $5_{nm}$, to be designed fully vertical. Minimizing the effect of lens curvature aberrations enables the smallest spread in the output beams $4_o$ and the best possible focusing for the receiving input beams $4_i$. The point emitters $5_{11}$ to $5_{nm}$ preferably emit output beams $4_o$ at a beam angle α that may be fully captured by the lens system 3. For example, if the NA of one or more of the point emitters $5_{11}$ to $5_{nm}$ is larger than the image space NA of the lens system 3, then a portion of the light emitting from the point emitters $5_{11}$ to $5_{nm}$, will not transmit through the lens system 3, therefore rendered as loss.

Figure 2:
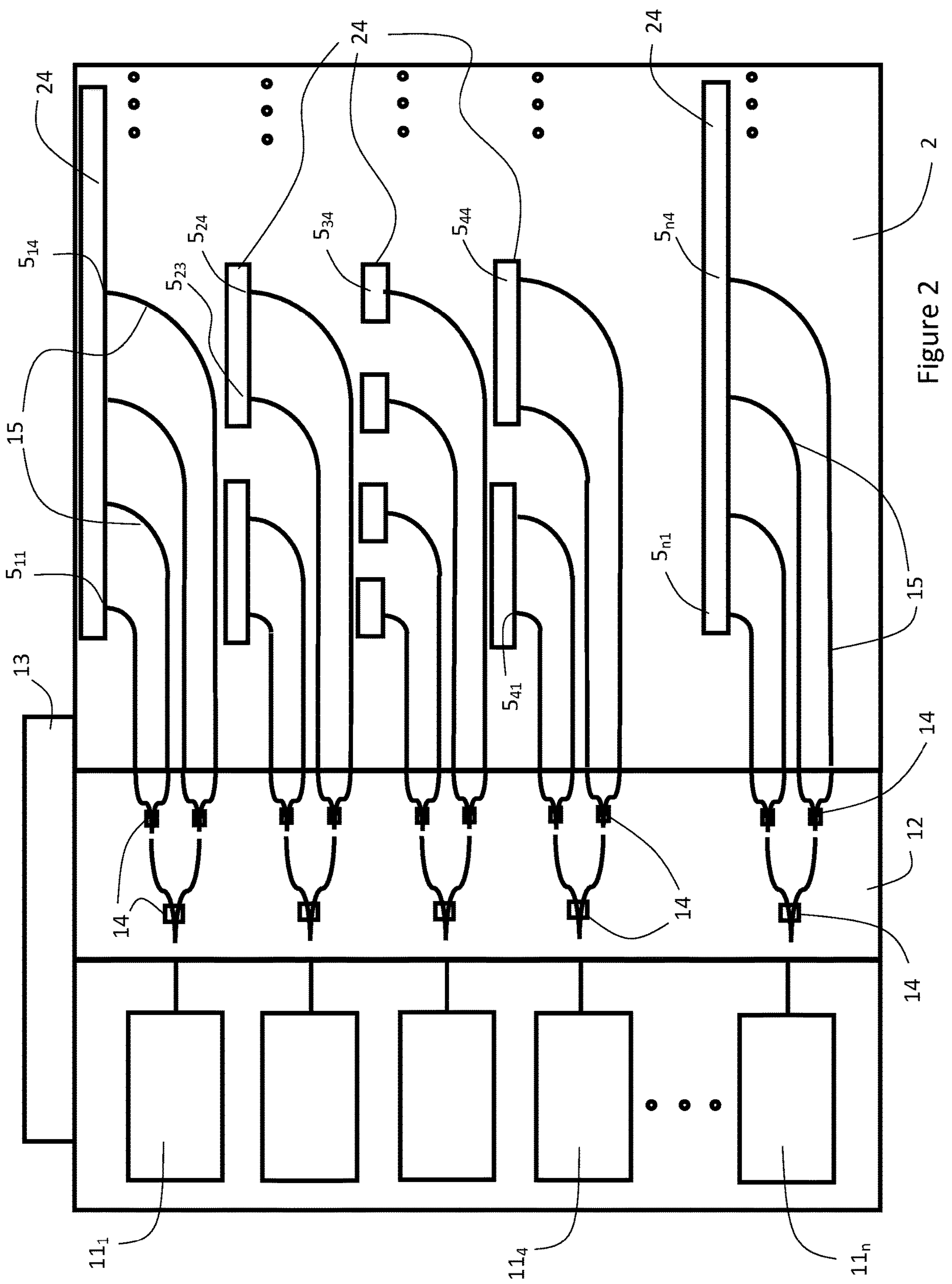
FIG. 2 is a plan view of an emitter array of the device of FIG. 1 with the turning substrate removed.

With reference to FIG. 2, the optical emitter device 1 may also include at least one light source, preferably an array of light sources, and at least one photodetector, preferably an array of photodetectors optically coupled to corresponding point emitters $5_{11}$ to $5_{nm}$ the emitter array 2. Preferably, the array of light sources and the array of light detectors comprises an array of transceivers $11_1$ to $11_n$. Each transceiver $11_1$ to 11*n* may comprise a laser, which generates at least one of the output beams $4_o$, and a photodetector, which detects at least one of the input beams $4_i$. Selectively sending and receiving light to and from the point emitters $5_{11}$ to $5_{nm}$, may be provided by a switching matrix 12 between the transceivers $11_1$ to $11_{nm}$ and the emitter array 2. Accordingly, to select a desired point emitter $5_{11}$ to $5_{nm}$, corresponding to a desired beam angle α, a controller 13 may select one of the light sources in one of the transceivers $11_1$ to $11_n$, corresponding to one of the rows, e.g. 1 to n, of point emitters $5_{11}$ to $5_{nm}$, then select one of the point emitters $5_{11}$ to $5_{nm}$ in that row by turning on and/or off various switches 14 in the switching matrix 12. For example, with four point emitters $5_{11}$ to $5_{nm}$ each row, m=4, the switching matrix 12 may have a single input port optically coupled to a switch tree comprising (m−1=3) switches 14, e.g. 2×2 on-chip Mach-Zehnder interferometers (MZI), which can be selectively activated to output the output beam $4_o$ to a desired output port. A plurality of optical waveguide cores 15 extend parallel to each other between the output ports of the switching matrix 12 to the point emitters $5_1$ to $5_n$. Each of the optical waveguide cores 15 may include a curved portion, e.g. a 90° curve, at an end thereof, each curved portion with a different radius of curvature configured to align each of the point emitters $5_{11}$ to $5_{nm}$, in a row. Each row of point emitters $5_{11}$ to $5_{nm}$ may be aligned with the other rows forming columns of point emitters $5_{11}$ to $5_{nm}$ in a n×m emitter array 2 of point emitters $5_{11}$ to $5_{nm}$. Ideally, the pitch of the point emitters $5_{11}$ to $5_{nm}$ in the emitter array 2 is 5 μm to 1000 μm or based on the focal length f, size L of the emitter array 2 and the angular resolution required by the LIDAR system:

$$\text{Pitch}=\text{resolution}/(2^*\arctan(L/2f))^*L$$

Similarly, when one of the incoming beams $4_i$ is received at the same point emitter $5_1$ to $5_n$, the incoming beam $4_i$ is transmitted in reverse via the corresponding optical waveguide core 15 to the switching matrix 12 back to the corresponding photodetector in the corresponding transceiver $11_1$ to $11_n$.

Figures 3A, 3B, 3C, 3D:
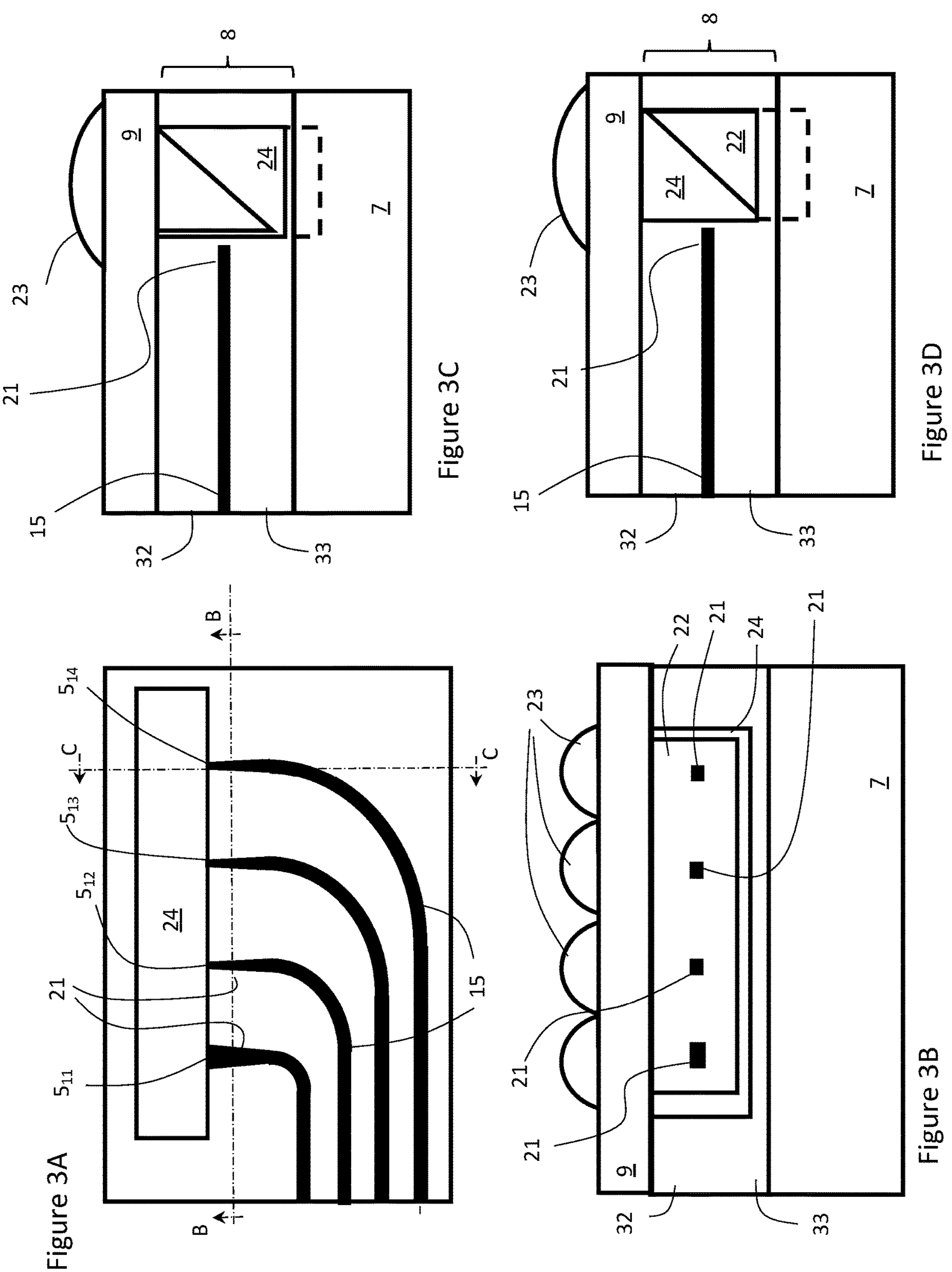
FIG. 3A is a plan view of a section of the emitter array of FIG. 2 with the turning substrate removed.
FIG. 3B is an end view of the section of the emitter array of FIG. 3A including the turning substrate.
FIG. 3C is an cross-sectional view of the section of the emitter array of FIG. 3A including the turning substrate.
FIG. 3D is an cross-sectional view of the section of the emitter array of FIG. 3A with an alternative example turning reflector and including the turning substrate.
Figures 4A, 4B, 4C, 4D:
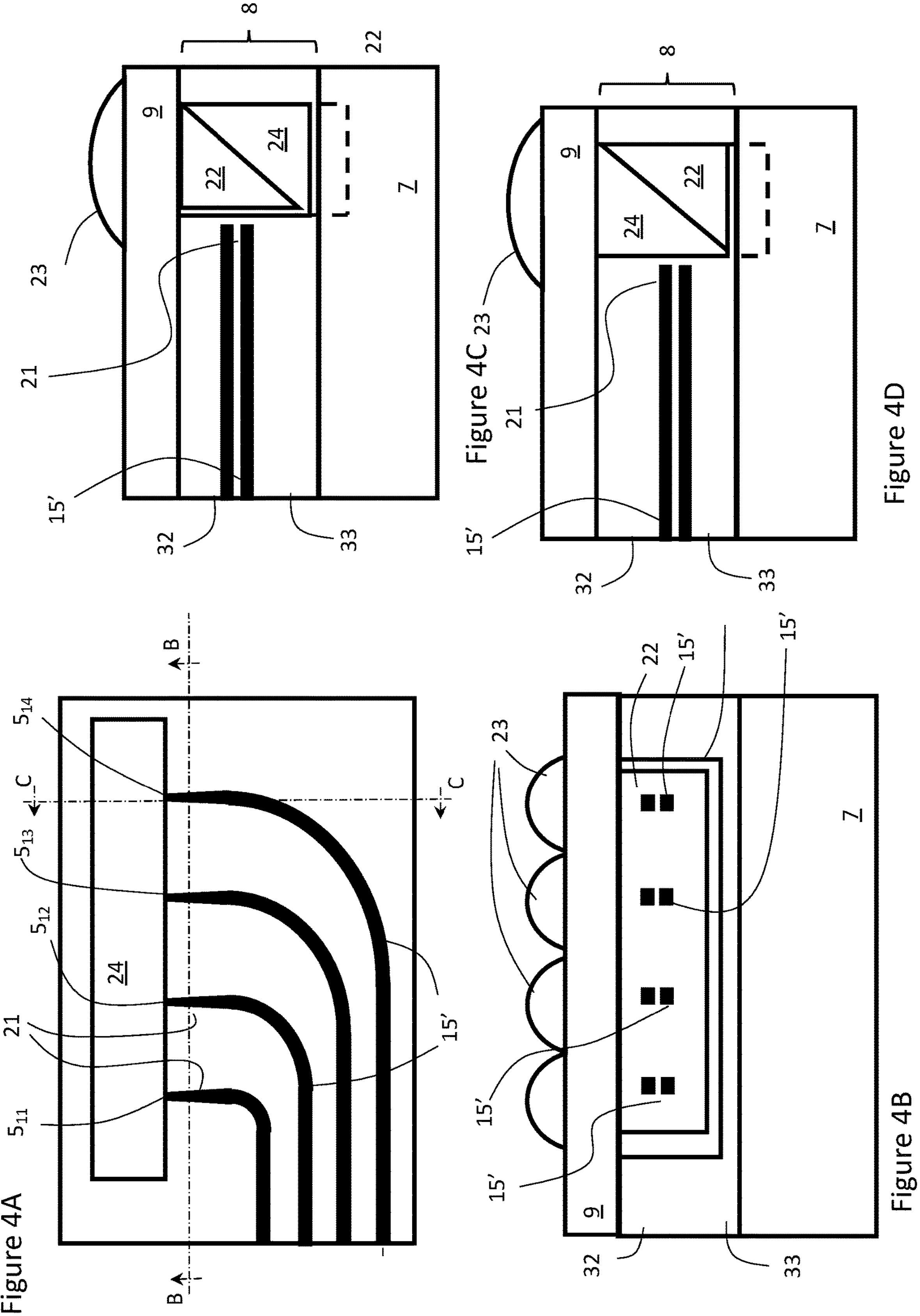
FIG. 4A is a plan view of a section of an alternative embodiment of the emitter array of FIG. 2 with the turning substrate removed.
FIG. 4B is an end view of the section of the emitter array of FIG. 4A including the turning substrate.
FIG. 4C is an cross-sectional view of the section of the emitter array of FIG. 4A including the turning substrate.
FIG. 4D is an cross-sectional view of the section of the emitter array of FIG. 4A with an alternative example turning reflector and including the turning substrate.
Figure 5:
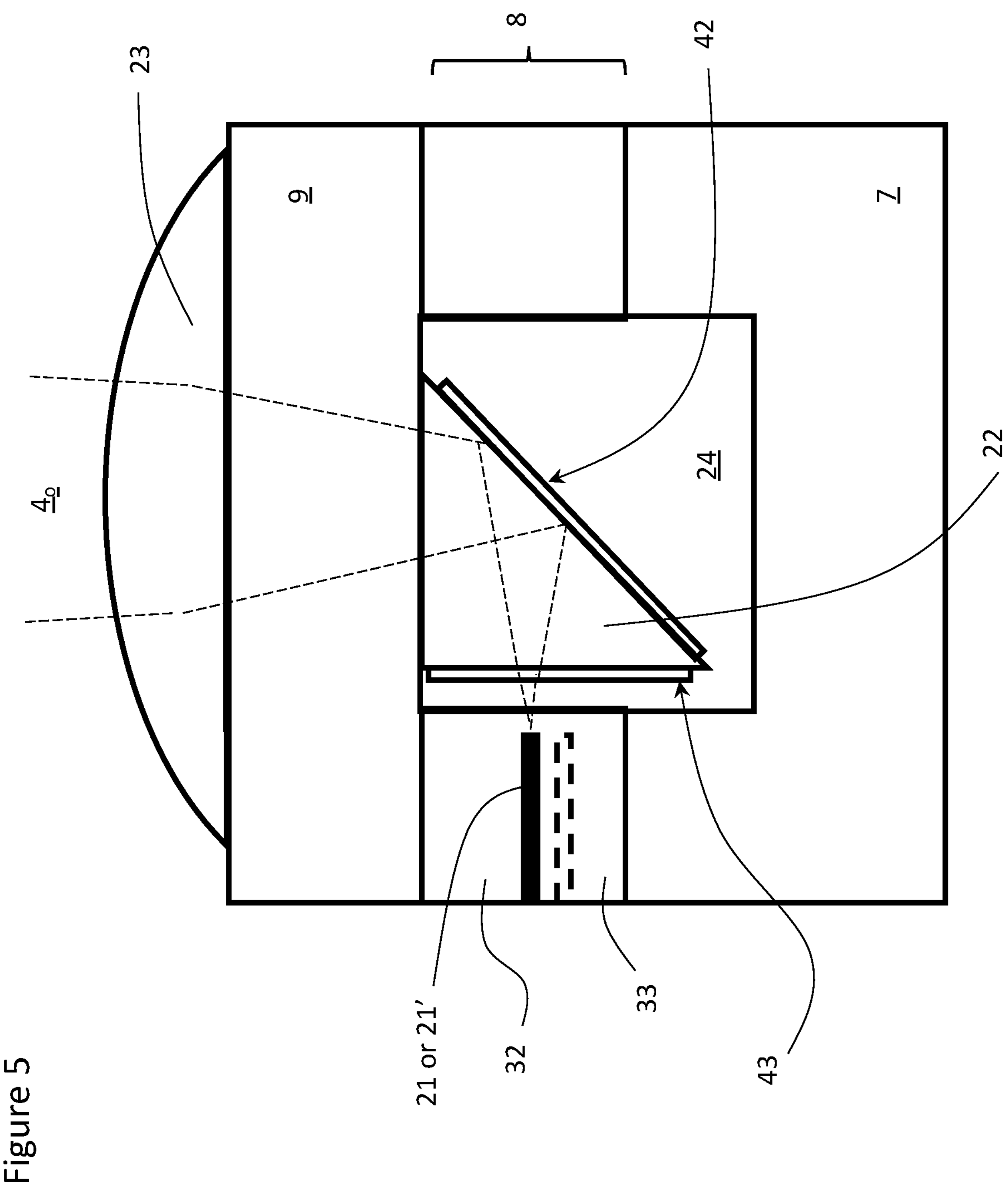
FIG. 5 is a cross-sectional view of a point emitter of the emitter array of FIG. 2 with the turning substrate.
Figure 6:
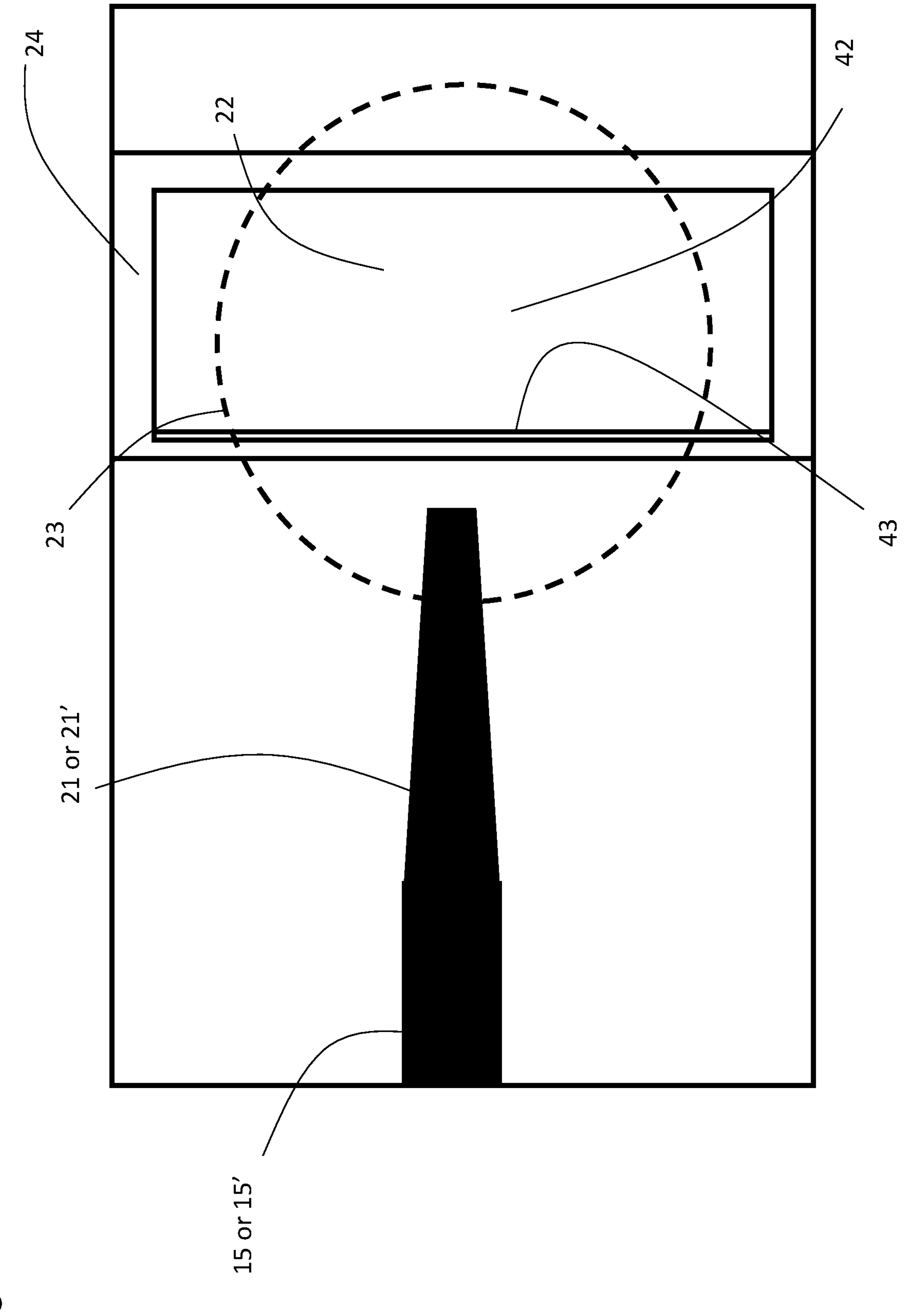
FIG. 6 is a top view of the point emitter of FIG. 5.

With reference to FIGS. 3A-4D, the point emitters $5_{11}$ to $5_{nm}$ may each comprise an end-fire taper 21 combined with a turning reflector 22, e.g. mirror, and an optional micro-lens 23, (See FIGS. 5 and 6 for further details). Unlike grating couplers, end-fire tapers 21 enable uniform broadband transmission of light with all possible polarization states. The turning reflector 22 may be disposed in a cavity or trench 24 provided in the optical waveguide structure 8 to direct the light emission from the end-fire tapers 21 to parallel with the optical axis OA of the lens system 3, e.g. vertically upwards from and perpendicular to an upper surface of the emitter array 2, which enables both a two-dimensional point emitter array 2 and a more streamlined assembly process.

A single trench 24 may be provided for a plurality of point emitters into which the ends of a plurality of the end fire tapers 21, positioned adjacent thereto, are directed. Ideally, one trench 24 is provided for an entire row, e.g. $5_{11}$ to $5_{14}$, of point emitters; however, one trench 24 for each point emitter, e.g. point emitter $5_{34}$, or one trench 24 for a group of, e.g. 2 or 3, point emitters, e.g. point emitters $5_{23}$ and $5_{24}$, is also possible. Each trench 24 is configured to receive the one or more corresponding turning reflectors 22 aligned with the ends of the end fire tapers 21, and may be between 2 μm and 150 μm deep, e.g. extend past the end fire taper, or preferably to the bottom of the optical waveguide structure 8 to the main substrate 7, and/or more preferably into the main substrate 7 (shown in dashed lines).

Furthermore, a single turning reflector 22 may be provided for a row of point emitters, e.g. $5_{11}$ to $5_{14}$, at which the output beams $4_o$ (and input beams $4_i$) of a plurality of end fire tapers 21 is directed. Ideally, one turning reflector 22 is provided for an entire row, e.g. $\mathbf{5}_{11}$ to $\mathbf{5}_{14}$, of point emitters; however, one turning reflector 22 for each point emitter, e.g. point emitter $\mathbf{5}_{34}$, or one turning reflector 22 for a group of, e.g. 2 or 3, point emitters, e.g. point emitters $\mathbf{5}_{23}$ and $\mathbf{5}_{24}$, is also possible. Some or all of the turning reflectors 22 may be mounted on the turning substrate 9 (FIGS. 3C and 4C) or mounted, e.g. deposited or etched, in the trench 24 (FIGS. 3D and 4D), as in hereinafter described with reference to FIGS. 9A to 9C. The turning reflector 22 width and height are about 5 μm to 100 μm, i.e. larger than the near field mode size of the end fire taper 21 divided by cos(45°).

FIG. 3A illustrates a top view of a section of the point emitter array 2 with the turning substrate 9 removed, i.e. showing one row of point emitters $\mathbf{5}_{11}$ to $\mathbf{5}_{14}$. Four point emitters are illustrated; however, additional point emitters are also within the scope of the invention. FIG. 3B illustrates a cross-sectional view of the section of the emitter array 2 taken along section B-B. FIGS. 3C and 3D are cross-section views of the emitter array 2 with alternative turning reflectors 22, taken along section C-C, i.e. the outer optical waveguide core 15 to the fourth point emitter $\mathbf{5}_{14}$. The emitter array 2 may include the optical waveguide structure 8, comprised of one or more optical waveguide layers configured to form the optical waveguide cores 15 and the end-fire tapers 21 surrounded by cladding, i.e. a material with a lower index of refraction. The optical waveguide cores 15 and the end-fire tapers 21 may be comprised of silicon (Si) or silicon nitride (SiN), or both Si and SiN or any other suitable optical waveguide core material. The optical waveguide structure 8 may be mounted on, e.g. grown on top of, the main substrate 7 with upper and lower cladding 32 and 33 surrounding the optical waveguide cores 15 and the end-fire tapers 21. The upper and lower cladding 32 and 33 may be comprised of on oxide material, such as silicon dioxide ($SiO_2$), e.g. 2-5 μm thick, and the main substrate 7 may be comprised of silicon, quartz or any suitable material. At least some of the end-fire tapers 21 may be 100 μm to 400 μm in length and taper down, e.g. by 25% to 75%, preferably by about one 50%, from the original width of the optical waveguide core 15, e.g. 400 nm to 500 nm wide by 200 nm to 250 nm thick, to a tip with a width of 50 nm to 300 nm and the original thickness, e.g. 200 nm to 250 nm, although the thickness may also be tapered to less than the optical waveguide core 15, if required. Preferably, the end of the end-fire tapers 21 may be symmetrical, e.g. square (200 nm×200 nm). At least some of the end-fire tapers 21, e.g. point emitter $\mathbf{5}_{11}$, may comprise reverse tapers, which expand, at least in width, from the original dimensions, e.g. width, of the optical waveguide core 15 to a wider width, e.g. 2× to 10× wider or to 1 μm to 4 μm wide. The thickness may also expand, if required. Some of the end fire tapers 21 may be narrowing in width and some of the end fire tapers 21 may be widening in width. Some of the end fire tapers 21 may narrow more or less than other end fire tapers 21, and some of the end fire tapers may widen more or less than the other end fire tapers 21.

Upon transmission from the end of the end-fire tapers 21 the guided optical mode travelling in the feeding optical waveguide core 15 expands. The mode expansion controls both the beam divergence and the efficiency of the emission through the lens system 3. The minimum achievable NA for bare silicon end-fire tapers into the, e.g. air, around the lens system 3 is about 0.38, which is difficult for the design of the lens system 3, because portions of the output beam $\mathbf{4}_i$ may expand beyond the NA of the lens system 3 and be lost. Alternatively, even if the lens system 3 has sufficiently high NA, optical aberrations often present in high-NA lenses may reduce the performance of the LIDAR system. High-NA systems without aberration are often expensive to manufacture and sensitive to misalignment and environmental disturbances like shock and temperature.

FIG. 4A illustrates a top view of a section of an alternative embodiment of the point emitter array 2 with the turning substrate 9 removed, i.e. showing one row of point emitters $\mathbf{5}_{11}$ to $\mathbf{5}_{14}$. FIG. 4B illustrates a cross-sectional view of the section of the emitter array 2 taken along section B-B. FIGS. 4C and 4D are cross-sectional views of the emitter array 2 with alternative turning reflectors 22 taken along section C-C, i.e. the outer bi-layer optical waveguide core 15' to the fourth point emitter $\mathbf{5}_{14}$. The emitter array 2 may include the optical waveguide structure 8 comprised of two optical waveguide layers configured to form bi-layer optical waveguide cores 15' and bi-layer end-fire tapers 21'. Including a second layer of optical waveguide enables mode profile engineering that may also enable modification of the NA of the emitter array 2, i.e. launching light into a coupled mode that has a broader mode spread results in a smaller NA. The bi-layer optical waveguide cores 15' and the bi-layer end-fire tapers 21' may be comprised of two similar optical waveguide materials with similar indexes of refraction, e.g. both silicon (Si) or both silicon nitride (SiN), or of two different optical waveguide materials with different indexes of refraction, such as a first index of refraction, e.g. Si, larger than a second index of refraction, e.g. SiN, or any other suitable optical waveguide core material. The waveguide layers may be mounted on, e.g. grown on top of, the main substrate 7 with upper and lower cladding 32 and 33 surrounding the dual optical waveguide cores 15' and end-fire tapers 21'. The upper and lower cladding 32 and 33 may be comprised of on oxide material, such as silicon dioxide ($SiO_2$), e.g. 2 μm thick, and the main substrate 7 may be comprised of silicon or any suitable material.

FIGS. 5 and 6 illustrate a cross-section and a top view, respectively, of the turning reflector 22 and the optional micro-lens 23, if required, combined with the end-fire taper 21 or the dual end fire taper 21'. The turning reflector 22 may be formed, e.g. etched, out of a separate, e.g. silicon or quartz, turning substrate 9, with an oblique wall angle, e.g. at 45° to the longitudinal axis of the end-fire taper 21 defining the transmission direction, and may be coated or configured with a reflective layer or coating 42, e.g. silver, copper, aluminum, gold, or a Bragg grating. If the turning reflector 22 has sufficiently high index of refraction $n_{reflector}$, e.g. silicon, and the trench 24 has sufficiently low index of refraction $n_{reflector}$, e.g. air, such that the majority of the beam $\mathbf{4}_o$ strikes the oblique wall at greater than the critical angle $\arcsin(n_{reflector}/n_{trench})$, the coating 42 may be omitted and the beam $\mathbf{4}_o$ may be reflected via total internal reflection. A flat vertical sidewall of the turning reflector 22 facing the end-fire taper 21 or 21' may be coated with an anti-reflection (AR) coating 43 to minimize the Fresnel reflection therefrom. Similarly, the top surface of the micro-lens 23 or the turning substrate 9 may be coated with an AR coating. The output beam $\mathbf{4}_o$ coming out of the end-fire tapers 21 or 21' adjacent to the trench 24 will expand, cross an air gap, e.g. 1 μm to 10 μm, and transmit through the vertical sidewall, i.e. AR coating 43, then hit and reflect off of the oblique reflective layer or coating 42 that redirects the light path upwards substantially perpendicular to the original transmission direction in the end-fire taper 21 and the upper surface of the point emitter array 2. The emission pattern of each output beam $\mathbf{4}_o$ (and input beam $\mathbf{4}_i$) may then be reshaped, e.g. collimated or focused, through the corresponding micro-lens 23. The goal of the micro-lens 23 is to convert the point emitter's NA to a smaller value, e.g. less than 0.2, preferably less than 0.15 for a more practical lens design. Each micro-lens 23 may be 25 μm to 200 μm in diameter. Each turning reflector 22 may have edges with lengths between 6 μm to 90 μm. The gap and/or the trench 24 may include an index matching material between the end-fire tapers 21 and the turning reflectors 22, i.e. a material with an index of refraction between the effective index of refraction of the mode in the end-fire tapers 21 and the index of refraction of the turning reflector 22, to at least reduce back reflections at the interface between the end fire taper 21 and the gap and/or the interface between the gap and the turning reflector 22.

Figure 7:
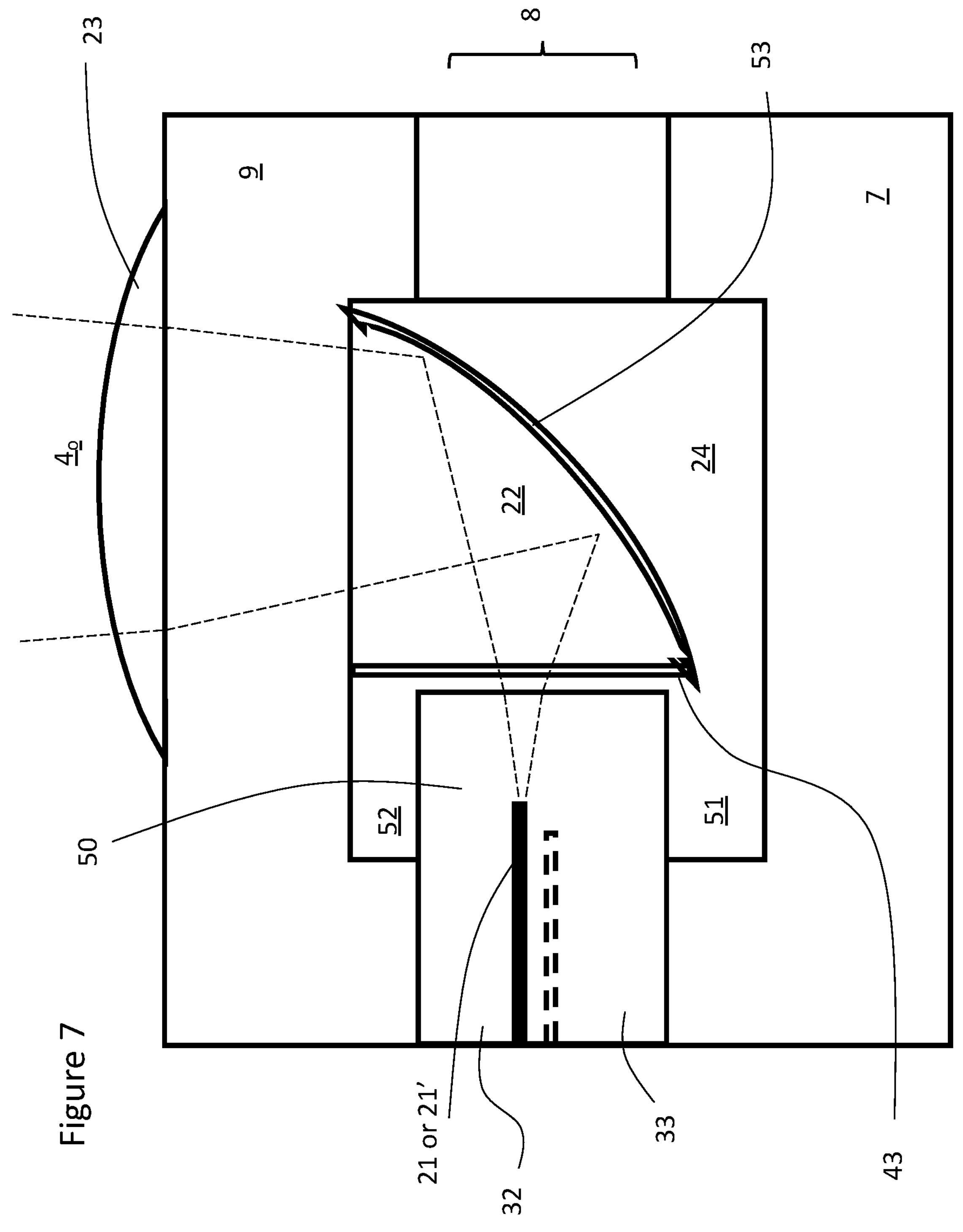
FIG. 7 is a cross-sectional view of an alternative embodiment of a point emitter of the emitter array of FIG. 2.
Figure 8:
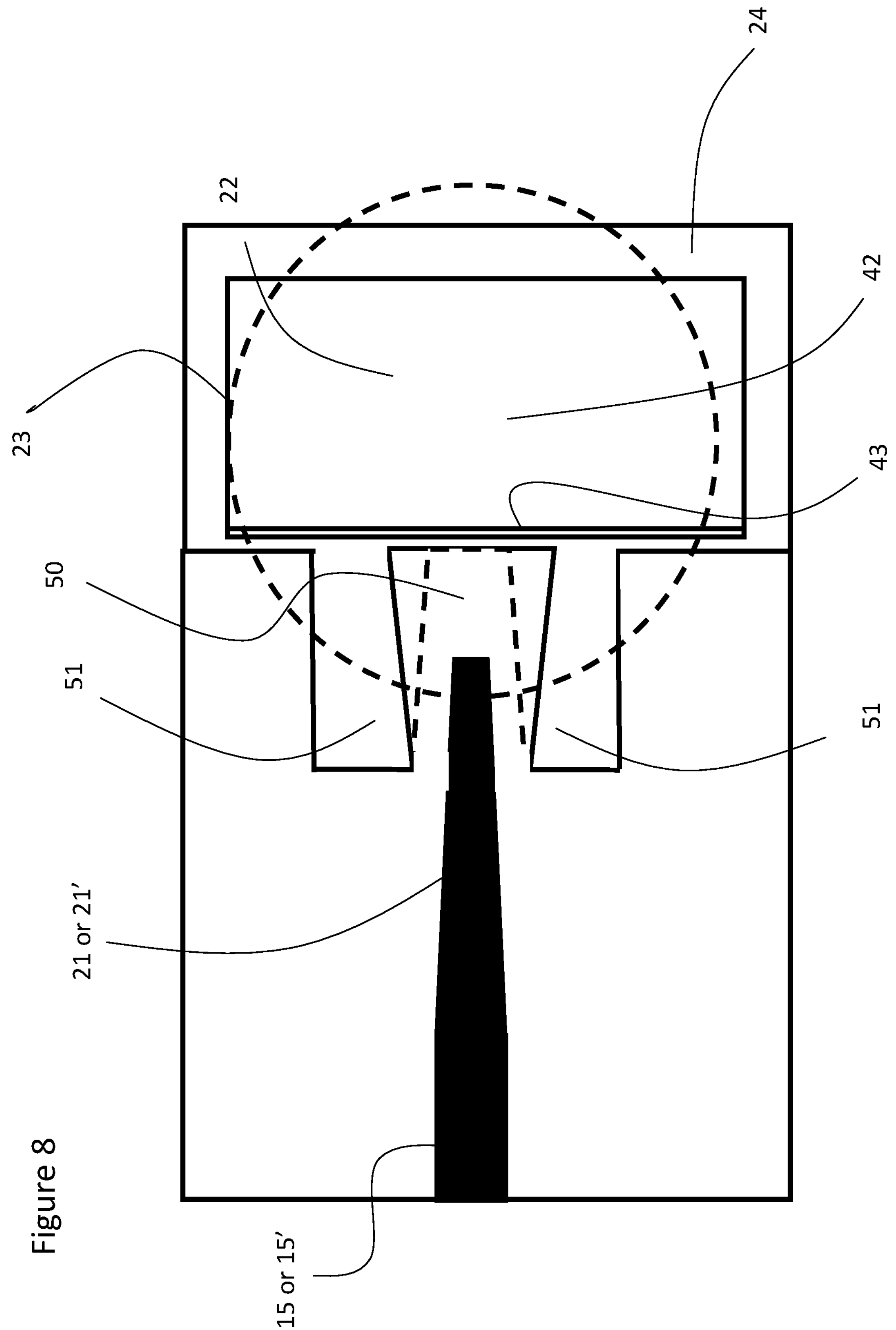
FIG. 8 is a top view of the point emitter of FIG. 7.

With reference to FIGS. 7 and 8, to further reduce the NA of the point emitters $\mathbf{5}_{11}$ to $\mathbf{5}_{nm}$, a suspended optical waveguide structure 50 may be provided optically coupled to the end of some or each of the end-fire tapers 21 or 21'. The suspended optical waveguide structure 50 may be comprised of the cladding material, e.g. $SiO_2$, now forming the optical waveguide core, surrounded by a pocket of material with a lower index of refraction, e.g. air, forming cladding. The suspended optical waveguide structure 50 may be suspended above the main substrate 7 by removing, e.g. etching, one or more of the substrate material from the main substrate 7 and/or the turning substrate 9 and/or the cladding material from the upper and lower cladding 32 and 33 beneath and/or around of the suspended optical waveguide structure 50 forming a pocket or chamber 51 around the suspended optical waveguide structure 50. Ideally, each trench 24 may be enlarged to extend underneath and/around the suspended optical waveguide structures 50 to form the pocket or chamber 51. The turning substrate 9, as in FIG. 8, may also be etched in selected areas above the suspended waveguide structure 50 forming channels 52 (FIG. 9C), such that the optical mode in the suspended optical waveguide structure 50 does not leak into either the main substrate 7 and/or the turning substrate 9. Accordingly, the NA for suspended waveguide structure 50/end-fire tapers 21 or 21' may be reduced to less than about 0.25, preferably less than 0.2, enabling the micro-lens 23 to convert the point emitter's NA to less than 0.20, preferably less than 0.15. The suspended optical waveguide structure 50 may extend 2 μm to 50 μm into the chamber 51 or the trench 24, whereas the end fire taper 21 or 21' may extend somewhat into the chamber 51 or the trench 24, but less than the full length of the suspended optical waveguide structure 50. The suspended optical waveguide structure 50 may have a thickness, e.g. 6 μm to 8 μm, the same as the total optical waveguide structure 8, or may be made thinner than the optical waveguide structure 8 by the local removal of some of the upper cladding 32. The suspended optical waveguide structure 50 may have a constant width about the same as the thickness, e.g. 6 μm to 8 μm. The suspended optical waveguide structure 50 may taper, i.e. narrowing width and/or height towards the outer free end thereof (dashed lines) or may reverse taper, i.e. widening width and/or height towards the outer free end thereof. Ideally, the end-fire taper 21 is positioned in the center both vertically and horizontally of the waveguide structure 50.

Furthermore, in some or all of the aforementioned embodiments, the turning reflector 22 may include an integrated curved reflector 53 on or forming the oblique surface thereof for further reducing the NA of the point emitters $\mathbf{5}_{11}$ to $\mathbf{5}_{nm}$. For example, a spherical, conic, or aspheric surface may be provided, e.g. etched or deposited, on the oblique surface of the turning reflector 22, e.g. with a radius of curvature of 0.1 mm to 1.0 mm. In embodiments with or without the curved reflector 53, the micro-lens 23 may not be required and may be omitted.

Figures 9A, 9B, 9C:
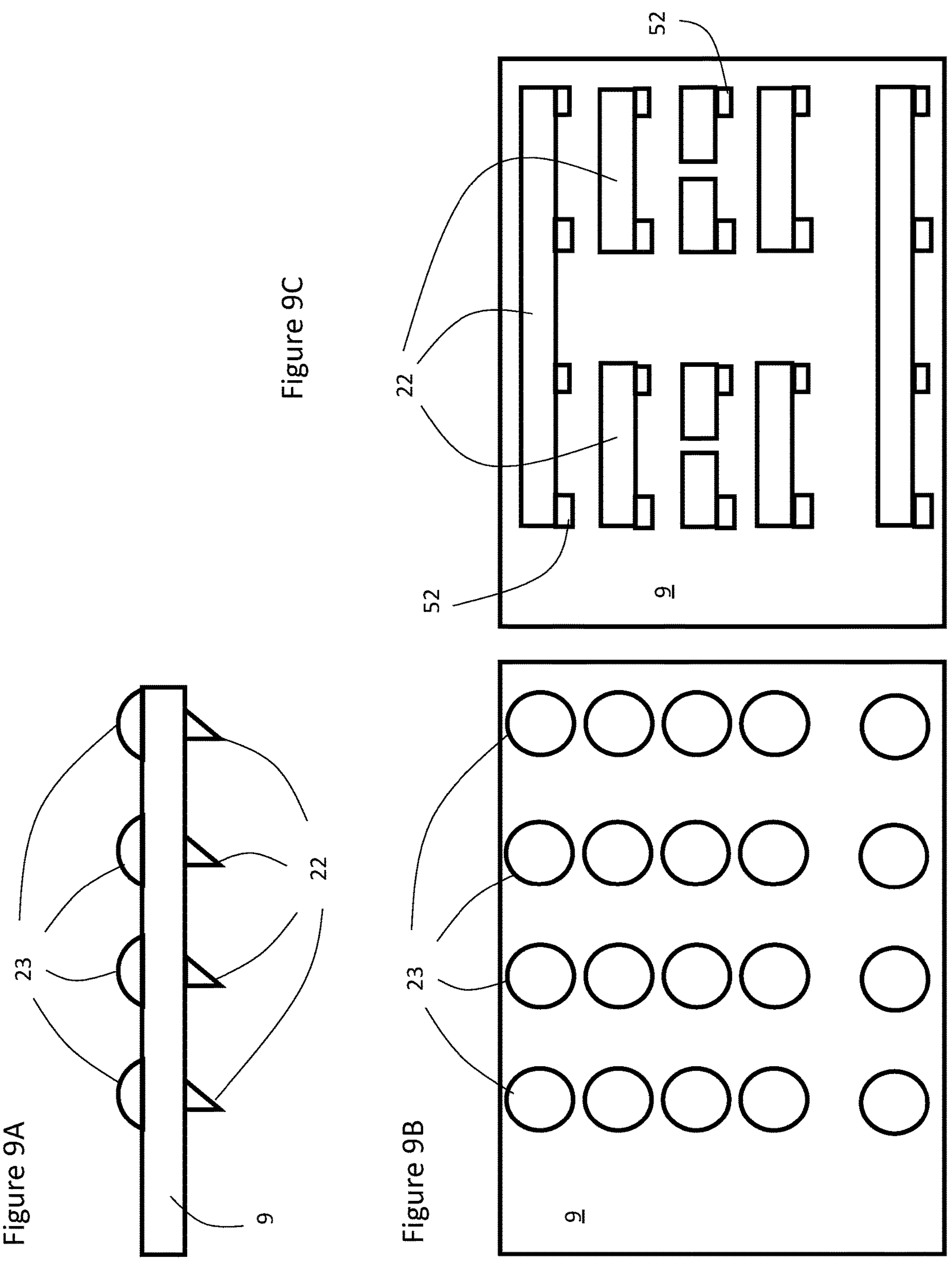
FIG. 9A is a side view of an example embodiment of a turning substrate for the optical emitter device of FIG. 1.
FIG. 9B is a top view of the turning substrate of FIG. 9A.
FIG. 9C is a bottom view of the turning substrate of FIG. 9A.

With reference to FIGS. 9A to 9C, the turning reflectors 22 and the micro-lenses 23 may be fabricated on the same turning substrate 9, whereby the plurality of turning reflectors 22 and the plurality of micro-lenses 23 may be configured on the same turning substrate 9, which may then be bonded on top of the photonics chip comprising the emitter array 2. Accordingly, the reflective layers or coatings 42, the AR coatings 43 and an AR coating over each of the micro-lenses 23 may be provided, e.g. coated, onto the corresponding features of the turning substrate 9 in a separate fabrication process to the fabrication of the optical waveguide structure 8. Furthermore, a plurality of the turning reflectors 22 may comprise a single monolithic structure, extending the length of the turning substrate 9 for reflecting a plurality of output beams $\mathbf{4}_o$ and input beams $\mathbf{4}_1$ from and to the point emitters, e.g. $\mathbf{5}_{14}$, $\mathbf{5}_{24}$, $\mathbf{5}_{34}$, $\mathbf{5}_{44}$, and $\mathbf{5}_{n4}$, in a column of the emitter array 2.

Figure 10:
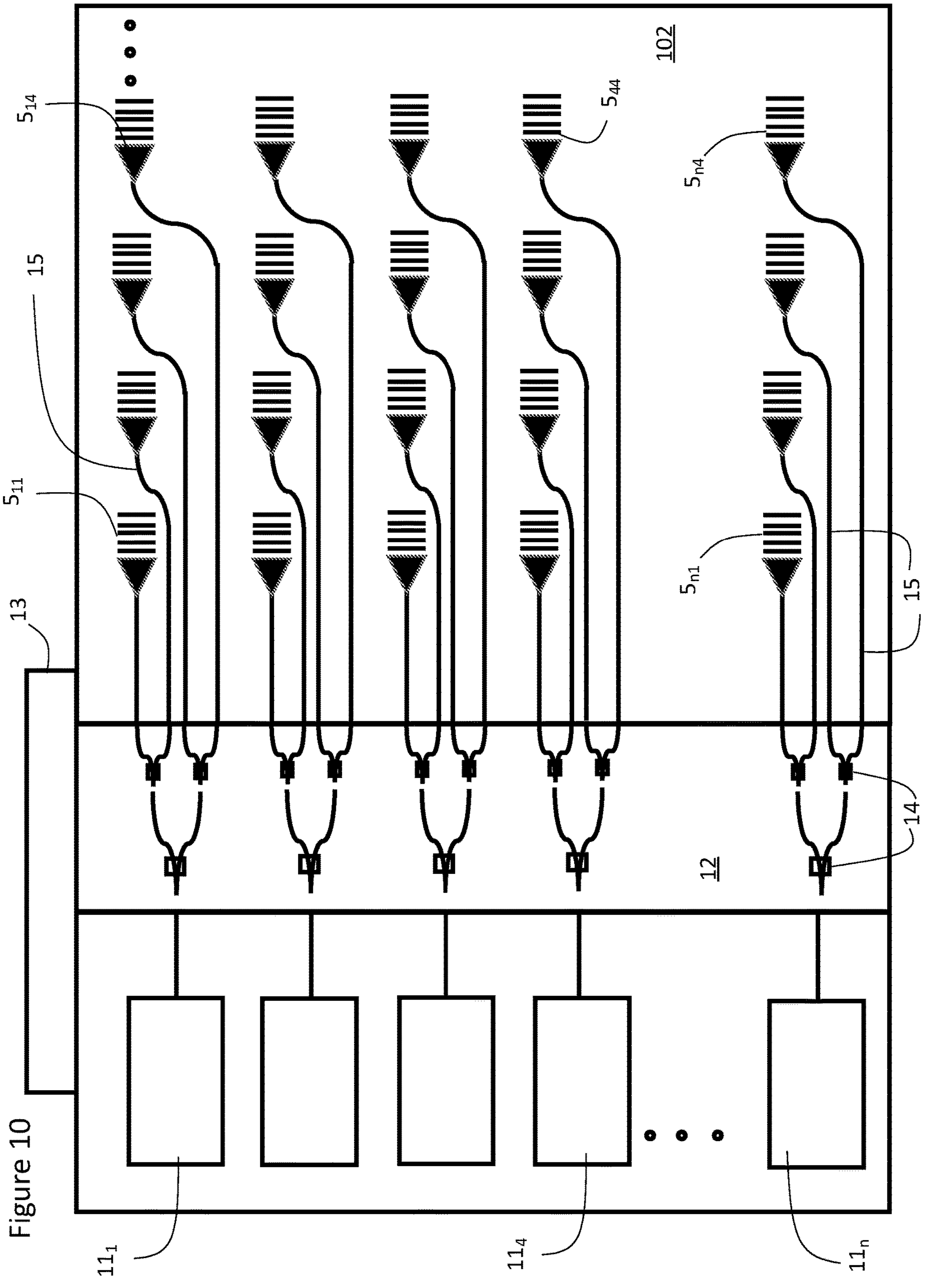
FIG. 10 is a plan view of an alternative embodiment of the emitter array of the device of FIG. 1.
Figures 11A, 11B:
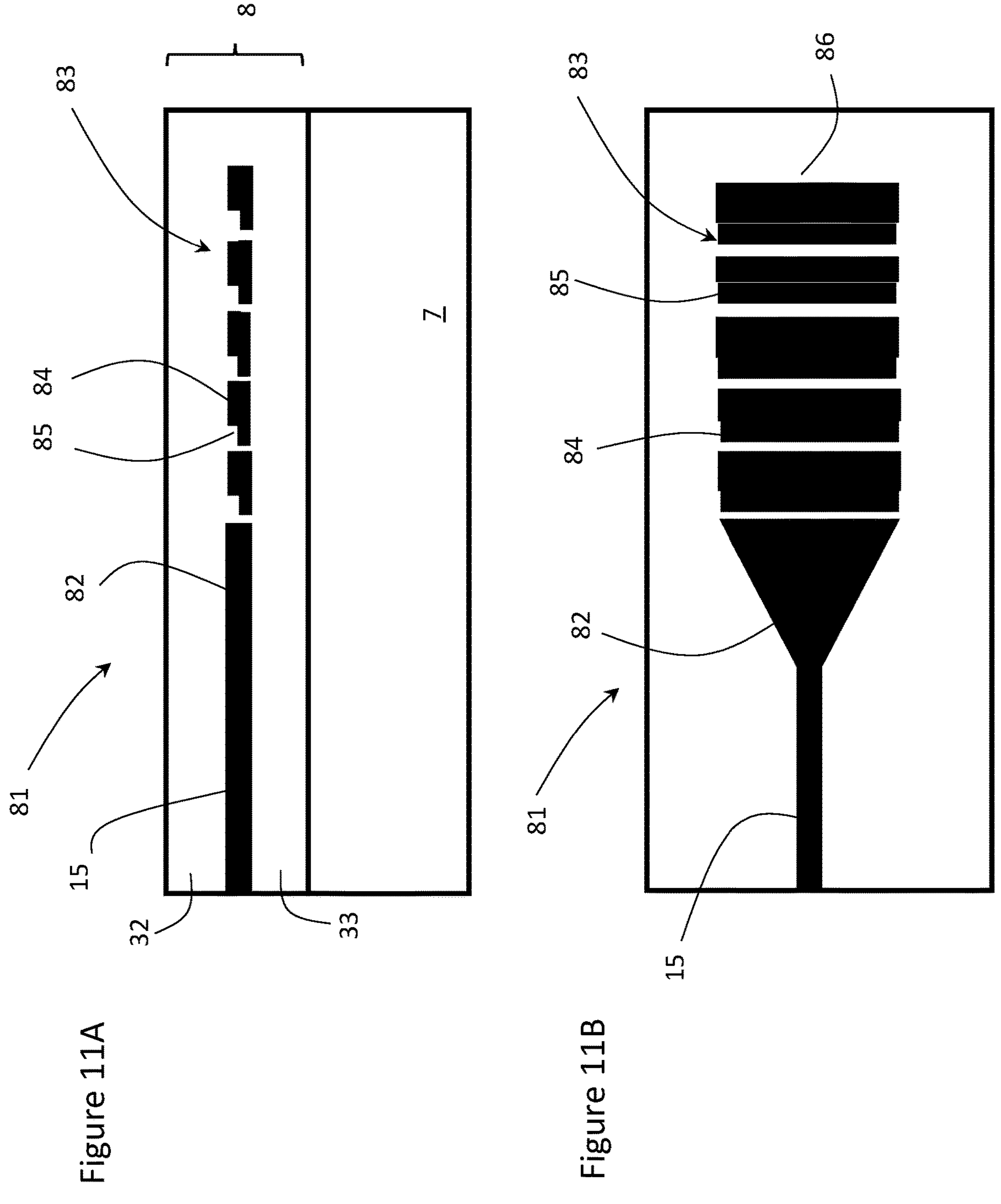
FIG. 11A is a cross-sectional view of an embodiment of a point emitter of the emitter array of FIG. 10.
FIG. 11B is a top view of the point emitter of FIG. 11A.

In an alternative embodiment, illustrated in FIGS. 10, 11A and 11B, an optical emitter device 101 includes an emitter array 102 and the beam steering lens system 3. As above with reference to FIG. 1, for beamforming, the highly focused or collimated output beam $\mathbf{4}_o$ may be transmitted when the point emitter $\mathbf{5}_{11}$ to $\mathbf{5}_{nm}$ from the emitter array 102 is placed on or near the focal plane F of the lens system 3 (infinite conjugation). The reverse propagation is also true based on the reciprocity theorem, which a parallel beam $\mathbf{4}_i$ shining on the lens system 3 will focus at a point spot, with a slight spread limited by lens aberration and diffraction. All other features of the optical emitter device 101 are similar to the optical emitter device 1, e.g. a main substrate 7 for supporting an optical waveguide structure 8, except that the point emitters $\mathbf{5}_{11}$ to $\mathbf{5}_{nm}$ may comprise a very small grating coupler 81 (length and width at the order of a few μm) connected to the feeding optical waveguide cores 15, which may all be provided, e.g. fabricated, in a silicon layer on a silicon-on-insulator (SOI) wafer. The grating coupler 81 may comprise an expanding optical waveguide section 82 and a corrugated grating section 83 comprising laterally-extending, i.e. perpendicular to transmission direction, periodic, spaced-apart, optical waveguide grating structures 84 with notches 85 extending partially through. The grating section 83 may include a width as wide as the wider outer end of the expanding optical waveguide section 82. The notches in the optical waveguide grating structures 84 may form a step, whereby a first portion of each optical waveguide grating structure 84 extends a different depth into the grating section 83 than a second portion of each grating section 83. For example, the first portion may be the full thickness of the grating section 83, which may be the same thickness as the expanding optical waveguide section 82, which may be the same thickness as the optical waveguide cores 15. The second portion may only extend partially through, e.g. 40% to 60%, the grating section 83. The corrugated grating coupler 81 may add an extra momentum to the incoming waveguide mode, then couples the guided mode into a free space emission. The pitch and the depth of the optical waveguide grating structures 84 may be configured such that: a) the angle of emission is as close to vertical, i.e. perpendicular to the original transmission direction and the upper surface of the emitter array 2, as possible, and b) the grating coupler strength is strong enough to emit almost all the light. Ideally, the grating coupler 81 is 50 nm to 500 nm thick, 5 μm to 20 μm in length, and 5 μm to 20 μm in width, with a grating period of 0.5 μm to 1 μm.

Figures 12A, 12B:
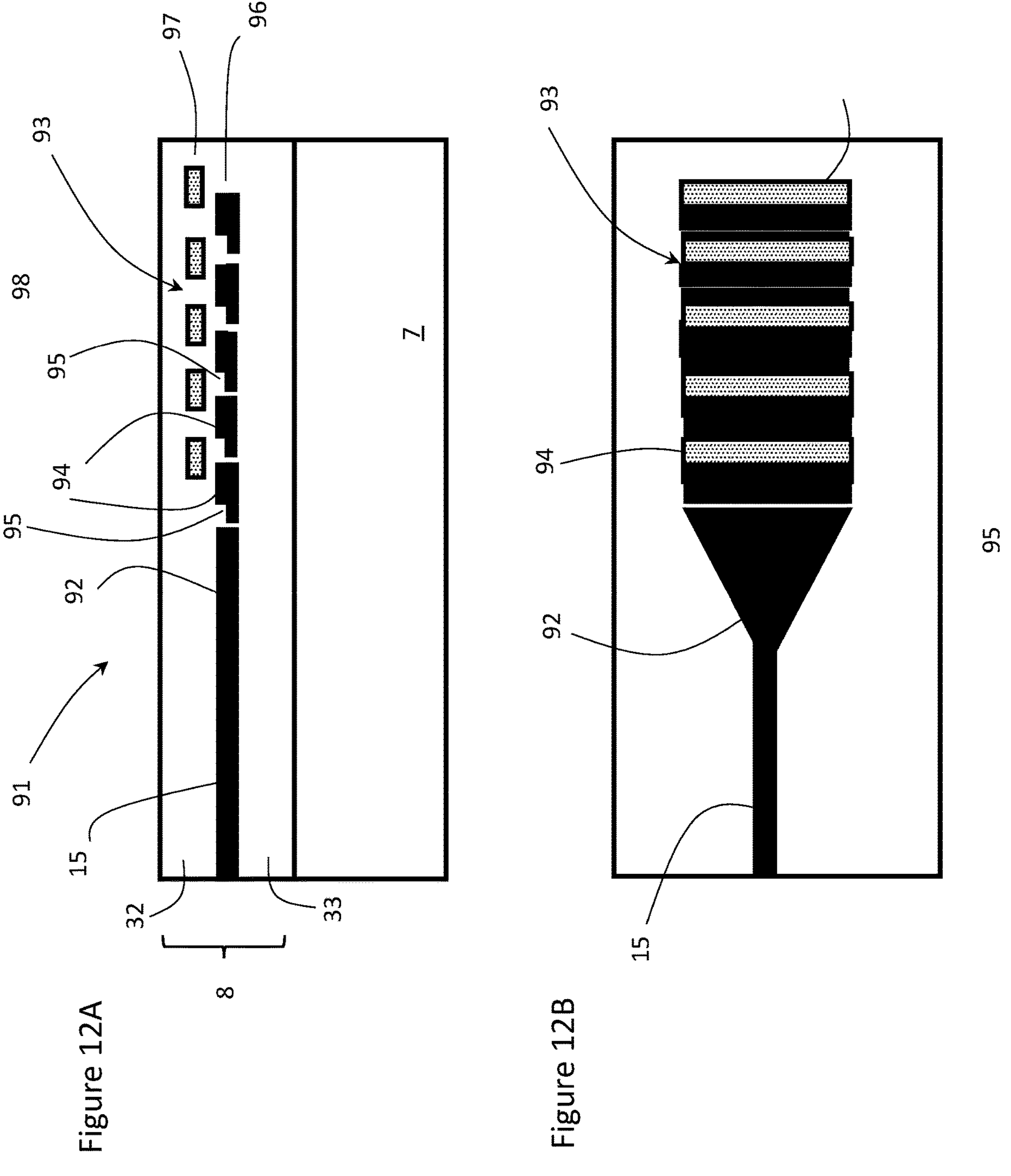
FIG. 12A is a cross-sectional view of an embodiment of a point emitter of the emitter array of FIG. 10.
FIG. 12B is a top view of the point emitter of FIG. 12A.

In an alternative embodiment, illustrated in FIGS. 12A and 12B, the point emitters $\mathbf{5}_{11}$ to $\mathbf{5}_{nm}$ may comprise a very small grating coupler 91 (length and width at the order of a few μm, e.g. 2 μm to 5 μm) connected to the feeding optical waveguide cores 15, which may all be provided, e.g. fabricated, in a silicon layer on a silicon-on-insulator (SOI) wafer. The grating coupler 91 may comprise an expanding optical waveguide section 92 and a corrugated grating section 93 comprising laterally-extending, i.e. perpendicular to transmission direction, periodic, spaced-apart, optical waveguide grating structures 94 with notches 95 extending partially therethrough. The grating section 93 may include a width as wide as the wider outer end of the expanding optical waveguide section 92. The grating section 93 may be comprised of a bilayer structure including a bottom layer 96 of a first optical waveguide material, e.g. silicon, and a top layer 97 comprised of a different material, with a lower index of refraction than the first material, e.g. a silicon nitride (SiN), all surrounded by upper and lower cladding 32 and 33, e.g. silicon dioxide. The notches 95 in the optical waveguide grating structures 94 in the bottom layer 96 may form a step, whereby a first portion of each optical waveguide grating structure 94 extends a different depth into the grating section 93 than a second portion of each optical waveguide grating structure 94. For example, the first portion may be the full thickness of the grating section 93, which may be the same thickness as the expanding optical waveguide section 92, which may be the same thickness as the optical waveguide cores 15. The second portion of the optical waveguide grating structure 94 may extend partially through, e.g. 40% to 60%, the grating section 93. The bottom and top layers 96 and 97 of the grating section 93 may have a translational offset, i.e. laterally offset from each other, whereby the grating structures in the top layer 97 overlap, i.e. superposed above, the spaces between the optical waveguide grating structures 94 in the bottom layer 96, and the spaces in the top layer 97 overlap the optical waveguide grating structures 94 in the bottom layer 96. The offset breaks the symmetry of the grating coupler 91 in the emitting direction. Ideally, the grating coupler 91 is 5 μm to 20 μm in length, and 5 μm to 20 μm in width, with a grating period of 0.5 μm to 1 μm. The pitch and the depth of the optical waveguide grating structures 94 may be configured such that: a) the angle of emission is as close to vertical, i.e. perpendicular to the original transmission direction and the upper surface of the emitter array 2, as possible, and b) the grating coupler strength is strong enough to emit almost all the light. Preferably, the thickness of the top layer 97, e.g. SiN, is 0.05 μm to 0.5 μm thick, with a separation between the bottom and top layers 96 and 97 is between 0 to 0.2 μm, preferably 0.05 μm to 0.02 μm. An example offset between grating material in the bottom and top layers 96 and 97 is between 0 to 0.5 μm, preferably 0.01 μm to 0.05 μm.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An optical emitter device comprising:

a plurality of point emitters arranged in an array comprising a plurality of rows of point emitters and a plurality of columns of point emitters, each of the plurality of point emitters comprising:

a grating coupler configured to receive light along a transmission direction and to emit a respective beam of light in an emission direction;

each grating coupler comprising:

a first plurality of periodically spaced optical waveguide grating structures forming a directional grating for asymmetrically emitting light in the emission direction, at least some of the first plurality of periodically spaced optical waveguide grating structures including a notch, whereby a first portion of each of the first plurality of periodically spaced optical waveguide grating structures extends a different height than a second portion; and a second plurality of periodically spaced optical waveguide grating structures superposed over the first plurality of periodically spaced optical waveguide grating structures, the second plurality of periodically spaced optical waveguide grating structures spaced apart from the directional grating in the emission direction.

2. The optical emitter device according to claim 1, wherein the second plurality of periodically spaced optical waveguide grating structures are laterally offset from the first plurality of periodically spaced optical waveguide grating structures.

3. The optical emitter device according to claim 2, wherein the second plurality of periodically spaced optical waveguide grating structures are laterally offset from the first plurality of periodically spaced optical waveguide grating structures by between 0.1 μm to 0.5 μm.

4. The optical emitter device according to claim 1, wherein the second plurality of periodically spaced optical waveguide grating structures are comprised of a different material than the first plurality of periodically spaced optical waveguide grating structures.

5. The optical emitter device according to claim 1, wherein the second plurality of periodically spaced optical waveguide grating structures are comprised of a different material with a lower index of refraction than the first plurality of periodically spaced optical waveguide grating structures.

6. The optical emitter device according to claim 5, wherein the second plurality of periodically spaced optical waveguide grating structures are comprised of silicon nitride; and the first plurality of periodically spaced optical waveguide grating structures are comprised of silicon.

7. The optical emitter device according to claim 1, wherein the second plurality of periodically spaced optical waveguide grating structures are 0.05 μm to 0.5 μm thick.

8. The optical emitter device according to claim 1, wherein the second plurality of periodically spaced optical waveguide grating structures are separated from the first plurality of periodically spaced optical waveguide grating structures by between 0 to 0.2 μm.

9. The optical emitter device according to claim 1, wherein each grating coupler is 2 μm to 5 μm in length, and 2 μm to 5 μm in width.

10. The optical emitter device according to claim 1, wherein the second portion only extends 40% to 60% a height of the first portion.

11. The optical emitter device according to claim 1, wherein a pitch and a depth of each grating coupler is configured such that the emission direction is substantially perpendicular to the transmission direction.

12. The optical emitter device according to claim 1, wherein each grating coupler is 5 μm to 20 μm in length, and 5 μm to 20 μm in width.

13. The optical emitter device according to claim 1, wherein each grating coupler is 2 μm to 5 μm in length, and 2 μm to 5 μm in width.

14. The optical emitter device according to claim 1, wherein the first plurality of periodically spaced optical waveguide grating structures includes a grating period of 0.5 μm to 1 μm.

15. The optical emitter device according to claim 1, wherein each grating coupler includes an expanding optical waveguide section extending to a respective one of the first plurality of periodically spaced optical waveguide grating structures.

16. The optical emitter device according to claim 1, further comprising:

a main substrate for supporting the plurality of point emitters; and an optical waveguide structure, comprising:

a plurality of optical waveguide cores, each one of the plurality of optical waveguide cores extending to a corresponding one of the plurality of point emitters with an expanding optical waveguide section therebetween; and cladding surrounding the plurality of optical waveguide cores.

17. The optical emitter device according to claim 1, further comprising a lens system, including a focal length and an optical axis, configured for redirecting the respective beams of light at a respective beam angle dependent upon a position of a respective one of the plurality of point emitters relative to the optical axis.

18. The optical emitter device according to claim 1, further comprising:

at least one light source for generating the light; and a switching matrix for selectively directing at least a portion of the light to one of the plurality of point emitters.

19. The optical emitter device according to claim 18, further comprising at least one photodetector for detecting incoming beams of light received by the plurality of point emitters.

* * * * *